United States Patent
Bjontegaard

(10) Patent No.: US 8,165,223 B2
(45) Date of Patent: Apr. 24, 2012

(54) DEBLOCKING FILTER

(75) Inventor: Gisle Bjontegaard, Oppegard (NO)

(73) Assignee: Cisco Technology, Inc., San Jose, CA (US)

( * ) Notice: Subject to any disclaimer, the term of this patent is extended or adjusted under 35 U.S.C. 154(b) by 0 days.

(21) Appl. No.: 12/951,915

(22) Filed: Nov. 22, 2010

(65) Prior Publication Data

US 2011/0122955 A1 May 26, 2011

Related U.S. Application Data

(63) Continuation of application No. 11/854,204, filed on Sep. 12, 2007, now Pat. No. 7,903,744, which is a continuation of application No. 11/250,187, filed on Oct. 13, 2005, now Pat. No. 7,283,588.

(30) Foreign Application Priority Data

Oct. 13, 2004 (NO) .................................. 20044349
Apr. 7, 2005 (NO) .................................. 20051721

(51) Int. Cl.
*H04N 7/12* (2006.01)
*H04N 11/02* (2006.01)
*H04N 11/04* (2006.01)
*G06K 9/36* (2006.01)
*G06K 9/46* (2006.01)
*G06K 9/40* (2006.01)

(52) U.S. Cl. ......... 375/240.26; 375/240.24; 375/240.25; 375/240.27; 382/232; 382/233; 382/260

(58) Field of Classification Search ............ 375/240.24–249.29; 382/232–233, 260
See application file for complete search history.

(56) References Cited

U.S. PATENT DOCUMENTS

| 6,360,024 | B1 * | 3/2002 | Tan et al. ........................ 382/260 |
| 6,665,346 | B1 * | 12/2003 | Lee et al. .................. 375/240.29 |
| 7,822,125 | B2 | 10/2010 | Bjontegaard |
| 2003/0058944 | A1 * | 3/2003 | MacInnis et al. ........ 375/240.13 |
| 2004/0081368 | A1 | 4/2004 | Mathew et al. |
| 2005/0013494 | A1 * | 1/2005 | Srinivasan et al. ............ 382/233 |

OTHER PUBLICATIONS

"Variable Block Size Transform for H264/AVC", IEEE Transaction on Circuits and Systems for Video Technology, 13(7), (2003).
Wiegand, Thomas, "Draft ITU-T Recommendation and Final Draft International Standard of Joint Video Specification (ITU-T REC. H.264, ISO/IEC 14496-10 AVC)", Chapter 8, Section 7, pp. 138-147, May 2003.
Sridhar Srinivasan, et al., "Windows Media Video 9: Overview and Applications", Signal Processing: Image Communication, vol. 19, No. 9, XP004607151, Oct. 1, 2004, pp. 851-875.
Gisle Bjontegaard, et al., "Simplified Luma Deblocking Filter", ITU—Telecommunications Standardization Sector, Study Group 16, Question 6, Video Coding Experts Group, No. VCEG-X04, XP030003421, Oct. 12, 2004, 3 pages.

* cited by examiner

*Primary Examiner* — Christopher S Kelley
*Assistant Examiner* — Chikaodili E Anyikire
(74) *Attorney, Agent, or Firm* — Oblon, Spivak, McClelland, Maier & Neustadt, L.L.P.

(57) ABSTRACT

The invention is related to decoding of block wise coded video pictures. The determination of using de-blocking filtering between coded blocks is based on alternative characteristics compared to the characteristics used in H.264/AVC.

4 Claims, 3 Drawing Sheets

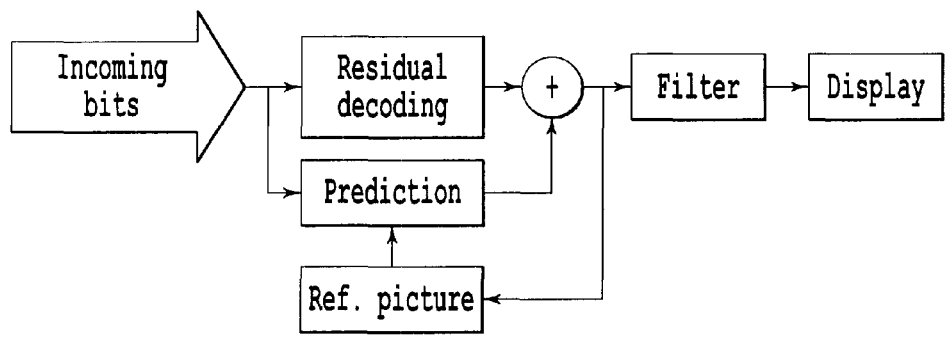
*Fig.1*
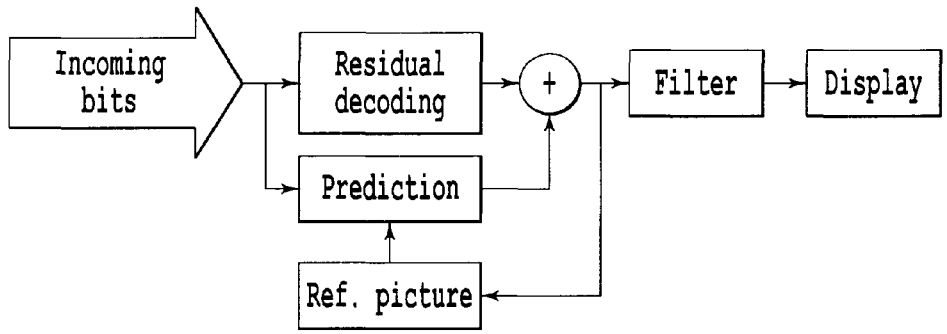
*Fig.2*
| a0 | b0 | c0 | d0 | e0 | f0 |
| a1 | b1 | c1 | d1 | e1 | f1 |
| a2 | b2 | c2 | d2 | e2 | f2 |
| a3 | b3 | c3 | d3 | e3 | f3 |
| a4 | b4 | c4 | d4 | e4 | f4 |
| a5 | b5 | c5 | d5 | e5 | f5 |
| a6 | b6 | c6 | d6 | e6 | f6 |
| a7 | b7 | c7 | d7 | e7 | f7 |
*Fig.3*

| Index A (for α) or (index B (for β)) | | | | | | | | | | | | | | | | | | | | | | | | | | |
|---|---|---|---|---|---|---|---|---|---|---|---|---|---|---|---|---|---|---|---|---|---|---|---|---|---|---|
| | 0 | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 | 24 | 25 |
| α | 0 | 0 | 0 | 0 | 0 | 0 | 0 | 0 | 0 | 0 | 0 | 0 | 0 | 0 | 0 | 0 | 4 | 4 | 5 | 6 | 7 | 8 | 9 | 10 | 12 | 13 |
| β | 0 | 0 | 0 | 0 | 0 | 0 | 0 | 0 | 0 | 0 | 0 | 0 | 0 | 0 | 0 | 0 | 2 | 2 | 2 | 3 | 3 | 3 | 3 | 4 | 4 | 4 |

*Fig. 4A*

| Index A (for α) or (index B (for β)) | | | | | | | | | | | | | | | | | | | | | | | | | | |
|---|---|---|---|---|---|---|---|---|---|---|---|---|---|---|---|---|---|---|---|---|---|---|---|---|---|---|
| | 26 | 27 | 28 | 29 | 30 | 31 | 32 | 33 | 34 | 35 | 36 | 37 | 38 | 39 | 40 | 41 | 42 | 43 | 44 | 45 | 46 | 47 | 48 | 49 | 50 | 51 |
| α | 15 | 17 | 20 | 22 | 25 | 28 | 32 | 36 | 40 | 45 | 50 | 56 | 63 | 71 | 80 | 90 | 101 | 113 | 127 | 144 | 162 | 182 | 203 | 226 | 255 | 255 |
| β | 6 | 6 | 7 | 7 | 8 | 8 | 9 | 9 | 10 | 10 | 11 | 11 | 12 | 12 | 13 | 13 | 14 | 14 | 15 | 15 | 16 | 16 | 17 | 17 | 18 | 18 |

| Index A | 0 | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 | 24 | 25 |
|---|---|---|---|---|---|---|---|---|---|---|---|---|---|---|---|---|---|---|---|---|---|---|---|---|---|---|
| bS = 1 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 1 | 1 | 1 |
| bS = 2 | 0 | 0 | 0 | 0 | 0 | 0 | 0 | 0 | 0 | 0 | 0 | 0 | 0 | 0 | 0 | 0 | 0 | 0 | 0 | 0 | 0 | 1 | 1 | 1 | 1 | 1 |
| bS = 3 | 0 | 0 | 0 | 0 | 0 | 0 | 0 | 0 | 0 | 0 | 0 | 0 | 0 | 0 | 0 | 0 | 0 | 1 | 1 | 1 | 1 | 1 | 1 | 1 | 1 | 1 |

Fig.5B

| Index A | 26 | 27 | 28 | 29 | 30 | 31 | 32 | 33 | 34 | 35 | 36 | 37 | 38 | 39 | 40 | 41 | 42 | 43 | 44 | 45 | 46 | 47 | 48 | 49 | 50 | 51 |
|---|---|---|---|---|---|---|---|---|---|---|---|---|---|---|---|---|---|---|---|---|---|---|---|---|---|---|
| bS = 1 | 1 | 1 | 1 | 1 | 1 | 1 | 1 | 2 | 2 | 2 | 2 | 3 | 3 | 3 | 4 | 4 | 4 | 5 | 6 | 6 | 7 | 8 | 9 | 10 | 11 | 13 |
| bS = 2 | 1 | 1 | 1 | 1 | 1 | 2 | 2 | 2 | 2 | 3 | 3 | 3 | 4 | 4 | 5 | 5 | 6 | 7 | 8 | 8 | 10 | 11 | 12 | 13 | 15 | 17 |
| bS = 3 | 1 | 2 | 2 | 2 | 2 | 3 | 3 | 3 | 4 | 4 | 4 | 5 | 6 | 6 | 7 | 8 | 9 | 10 | 11 | 13 | 14 | 16 | 18 | 20 | 23 | 25 |

DEBLOCKING FILTER

CROSS-REFERENCE TO RELATED APPLICATIONS

The present continuation application claims the benefit of priority under 35 U.S.C. 120 to application Ser. No. 11/854,204, filed on Sep. 12, 2007, which is a continuation of U.S. application Ser. No. 11/250,187 filed on Oct. 13, 2005, and claims the benefit of priority under 35 U.S.C. 119 from Norwegian Patent Application No. 20051721 filed on Apr. 7, 2005 and Norwegian Patent Application No. 20044349 filed on Oct. 13, 2004. The contents of each of these documents are incorporated herein by reference.

BACKGROUND OF THE INVENTION

1. Field of the Invention

The invention is related to decoding of block wise coded video pictures.

2. Description of the Related Art

Transmission of moving pictures in real-time is employed in several applications like e.g. video conferencing, net meetings, TV broadcasting and video telephony.

However, representing moving pictures requires bulk information as digital video typically is described by representing each pixel in a picture with 8 bits (1 Byte) Such uncompressed video data results in large bit volumes, and can not be transferred over conventional communication networks and transmission lines in real time due to limited bandwidth.

Thus, enabling real time video transmission requires a large extent of data compression. Data compression may, however, compromise with picture quality. Therefore, great efforts have been made to develop compression techniques allowing real time transmission of high quality video over bandwidth limited data connections.

In video compression systems, the main goal is to represent the video information with as little capacity as possible. Capacity is defined with bits, either as a constant value or as bits/time unit. In both cases, the main goal is to reduce the number of bits.

The most common video coding method is described in the MPEG* and H.26* standards. The video data undergo four main processes before transmission, namely prediction, transformation, quantization and entropy coding.

The prediction process significantly reduces the amount of bits required for each picture in a video sequence to be transferred. It takes advantage of the similarity of parts of the sequence with other parts of the sequence. Since the predictor part is known to both encoder and decoder, only the difference has to be transferred. This difference typically requires much less capacity for its representation. The prediction is mainly based on vectors representing movements. The prediction process is typically performed on square block sizes (e.g. 16×16 pixels). Note that in some cases, predictions of pixels based on the adjacent pixels in the same picture rather than pixels of preceding pictures are used. This is referred to as intra prediction, as opposed to inter prediction. Consequently, when the pixels in a block are coded by means of intra prediction, the block is said to be an intra coded.

The residual represented as a block of data (e.g. 4×4 pixels) still contains internal correlation. A well-known method of taking advantage of this is to perform a two dimensional block transform. In H.263 an 8×8 Discrete Cosine Transform (DCT) is used, whereas H.264 uses a 4×4 integer type transform. This transforms 4×4 pixels into 4×4 transform coefficients and they can usually be represented by fewer bits than the pixel representation. Transform of a 4×4 array of pixels with internal correlation will probability result in a 4×4 block of transform coefficients with much fewer non-zero values than the original 4×4 pixel block.

Direct representation of the transform coefficients is still too costly for many applications. A quantization process is carried out for a further reduction of the data representation. Hence the transform coefficients undergo quantization. A simple version of quantisation is to divide parameter values by a number—resulting in a smaller number that may be represented by fewer bits. It should be mentioned that this quantization process has as a result that the reconstructed video sequence is somewhat different from the uncompressed sequence. This phenomenon is referred to as "lossy coding". The outcome from the quantisation part is referred to as quantized transform coefficients.

Entropy coding implies lossless representation of different types of parameters such as overhead data or system description, prediction data (typically motion vectors), and quantized transform coefficients from the quantisation process. The latter typically represent the largest bit consumption.

The coding is performed on block wise parts of the video picture. A macro block consists of several sub blocks for luminance (luma) as well as for chrominance (chroma).

The present video standards H.261, H.262, H.263, H.264/AVC, MPEG1, MPEG2, MPEG4 all use blockbased coding. This means blockbased prediction from previously encoded and decoded pictures as well as blockbased coding of residual signal.

Blockbased coding/decoding has proven to be very efficient. However, one of the drawbacks is that the reconstructed image may include visible artifacts corresponding to the blocks used for prediction and residual signal coding. This phenomenon is usually referred to as blocking or blocking artifacts.

One way of reducing the artifacts known in prior art is to add a post processing filter between the decoder an the display unit at the receiver. An example of which is shown in FIG. 1. The filtering operation takes place right before the presentation of the picture. It is therefore a pure decoder/display issue that is unrelated to what the encoder does. In alternative solution, as shown in FIG. 2, the filter is integrated in the coding loop. This is a more powerful approach, and is the preferred solution in the specification ITU-T Rec. H.264|ISO/IEC 14496-10 AVC, even if it implies that both encoder and decoder need to do the same operations to avoid drift in the reconstructed pictures. However, the integrated solution is a quite processor consuming i.a. as it requires a test procedure for each pixel line crossing the block edges to be smoothed.

SUMMARY OF THE INVENTION

The present invention discloses a method in video decoding for reducing blocking artifacts between a first and a second block in a block wise coded video picture by performing a test on pixel lines crossing a boundary and/or an extension of the boundary between the first and the second block and executing a de-blocking filter operation on boundary neighboring pixels if the test indicates artifacts, wherein the method further includes performing the test on a subset of the pixel lines only, and if the test indicates artifacts, executing a de-blocking filter operation on the boundary neighboring pixels in each of the pixel lines crossing the boundary.

BRIEF DESCRIPTION OF THE DRAWINGS

In order to make the invention more readily understandable; the discussion that follows will refer to the accompanying drawings and tables.

FIG. 1 is a block scheme illustrating a decoder with a post-processing de-blocking filter, FIG. 2 is a block scheme illustrating a decoder with an integrated de-blocking filter, FIG. 3 illustrates a boundary between two blocks and lines of adjacent pixel positions crossing the boundary, FIG. 4 shows a look-up table from the H.264/AVC specification for threshold values FIG. 5 shows a look-up table from the H.264/AVC specification for clipping values.

DETAILED DESCRIPTION OF THE PREFERRED EMBODIMENTS

The present invention is an improvement of prior art method for removal of blocking and quantization noise. As already mentioned, this method is described in the specification ITU-T Rec. H.264|ISO/IEC 14496-10 AVC, the basics of which are described in the following.

In H.264/AVC an adaptive deblocking filter is applied in the coding loop. This means that further prediction is performed on filtered images. The filter is designed to remove as much as possible of the blocking and quantization noise and still maintain as much of the image content as possible. It is often a challenge to separate quantization noise and picture content. This is why the filter is highly content adaptive and therefore complex concerning computational operations.

In FIG. 3, an edge between two picture blocks is shown. The letters c and d denotes two adjacent pixel positions on each side of the edge, and the other letters denotes the 6 horizontal pixel positions closest to the two first-mentioned pixels. According to H.264/AVC, pixels b c d e may be modified based on the value of each of the pixels and on the characterization of the edge itself. This modification is for equalizing the above-mentioned artifacts. The modification is therefore carried out only when artifacts are likely to occur.

Similar filter operations are performed on all the lines a, b, c, d, e, f. In the following description, the letters will be used without the numbering 0-7.

According to H.264, a strength value (Str) is defined for the edge. This strength value reflects whether artifacts are likely to occur between two blocks and depends on one or more of the following situations are detected:

a) If any of the two blocks on each side of the boundary is intra coded, i.e. coded based on already coded blocks in present picture.

b) If any of the two blocks on each side of the boundary includes nonzero transform coefficients c) If the size of motion vectors used to predict the blocks on each side of the boundary exceeds a certain threshold.

Furthermore, to each 4×4 block a Quantization Parameter (QP) is assigned. The QP representing the edge is the maximum value of the QPs representing the 2 blocks.

Several QP dependant threshold parameters are used:

$\alpha(QP)$ $\beta(QP)$ $\gamma(QP, Str)$ $\alpha$, $\beta$ and $\gamma$ are found in the look-up tables shown in FIG. 4. Table 1 is the look-up table for determining $\alpha$, $\beta$ and table 2 is the look-up table for determining $\gamma$, which is a clipping value. Here, indexA and indexB denotes QP, and bS=1, 2, 3 corresponds to criteria c, b, a, respectively, which are listed above. Consequently, the deciding criteria a, b, c, also state the boundary characteristics.

Based on these values, a main test is performed determining whether de-blocking filtering is to be carried out or not.

Filtering is performed only if:

$|c-d|<\alpha(QP)$ and $|b-c|<\beta(QP)$ and $|d-e|<\beta(QP)$

If the above statement is true, then a delta is calculated:

$\Delta=(b-4c+4d-e)/8$

This delta value is then clipped within the range $(-\gamma,\gamma)$ As an example of clipping, if the quantization value is 32 and the characteristic of the boundary comply with criterion b, which corresponds to bS=2, the table indicates that $\gamma$ is 2. This implies that delta should be clipped within the interval $\{-2, 2\}$. I.e. when delta is greater than 2, delta is assigned the value 2, when delta is less than −2, delta is assigned the value −2, and when delta lies is within $\{-2,2\}$, delta remains unchanged.

Delta is then used to calculate modified values:

$c'=c+\Delta$ $d'=d-\Delta$

An additional test is performed to decide if b also is to be corrected:

$|a-c|<\beta(QP)$

If this is true, then a value $\delta$ is calculated:

$\delta=(2a-4b+c+d)/2$

The value is then further clipped the value to the range $(-\gamma',\gamma')$, wherein $\gamma'$ is a slight modification of $\gamma$. A modification of b is then calculated by means of $\delta$:

$b'=b+\delta$

The test and calculation is similar for e:

$|c-f|<\beta(QP)$:

If this is true another value $\delta$ is calculated:

$\delta=(2f-4e+c+d)/2$

The value is then further clipped to the range $(-\gamma',\gamma')$. A modification of e is then calculated by means of $\delta$:

$e'=e+\delta$

The present invention is based on the standardized method described above, but discloses a simplification resulting in a reduction in complexity without compromising too much with the qualitative result of the de-blocking operation.

Two embodiments of the invention will now described by an illustrative example.

The main difference compared to prior art, is that the decision test for filtering/no-filtering preformed on one or a subset of lines crossing the a boundary between two macro blocks applies to all the lines crossing the same boundary. If more than one "decision line" is involved in the decision test, as will follow from the description bellow, when considering the criterions a) b) c) above, not only two, but four blocks must be taken into account. The "decision lines" will cross two different boundaries, and hence involving four blocks.

As a first embodiment of the present invention, the second line in the FIG. 4 is selected as the "decision line" for the four lines 0-3 crossing the boundary.

Then, filtering of all 4 edge lines are performed if:

$d=(|a1-2b1+c1|+|d1-2e1+f1|)<\beta(QP)$

Otherwise no filtering is performed.

As opposed to prior art, the test for one line applies for all the lines crossing the block boundary. Thus, the value $\beta$ is not necessarily determined in the same way as the $\beta$ earlier described herein. E.g. other look-up tables than those depicted in FIGS. 4 and 5 may be used to determine $\beta$.

In a second embodiment of the present invention, the third and the sixth line of in FIG. 4 in combination are used as the "decision lines" for all the eight lines 0-7 crossing the boundary.

Then, filtering of all 8 edge lines are performed if:

$$d'=(|a2-2b2+c2|+|d2-2e2+f2|+|a5-2b5+c5|+|d5-2e5+f5|)<\beta'(QP)$$

Otherwise no filtering is performed. $\beta'$ may also be determined in still a another way than in prior art. A typical relation to $\beta$ of the first embodiment would be $\beta'=2\beta$.

Further, if the above tests on the "decision line" is true, a separate calculation is performed for each of the line for deriving delta and a corresponding corrected pixel values. This can generally be expressed as in the following, using the same notation as for the description of prior art:

$$\Delta=(a-b-2c+2d+e-f)/4$$

Alternatively, for accommodating the calculation to the state of the art processor commonly used in codecs for videoconferencing, expression above could be transformed to:

$$\Delta = \frac{d+\frac{a+e}{2}}{2} - \frac{c+\frac{b+f}{2}}{2}$$

The delta value is clipped the value to the value range $(-\gamma,\gamma)$ $$b'=b+\Delta/2$$

$$c'=c+\Delta$$

$$d'=d-\Delta$$

$$e'=e-\Delta/2$$

Simulations comparing the prior art H.264 filter and a filter according to the present invention has shown a decreased requirement for computational resources of about 50%, with practically the same subjective image quality.

The description herein has been related to filtering of block artifacts in the horizontal direction, i.e. filtering pixels on both sides of vertical block boundaries. However, the present invention is directly applicable to filtering of block artifacts in vertical direction. This implies a 90° rotation of the pixels notation in FIG. 3.

The invention claimed is:

1. A method comprising
performing, at a video decoding apparatus, a test of pixel lines crossing a boundary between first and second blocks in a block-wise coded video picture; and
modifying, at the video decoding apparatus, neighboring pixels on the pixel lines crossing the boundary with a $\Delta$ value calculated by a function based on a weighted sum of a third closest pixel on a left hand side of the boundary, a second closest pixel on the left hand side of the boundary, a closest pixel on the left hand side of the boundary, a closest pixel on a right hand side of the boundary, a second closest pixel on the right hand side of the boundary, and a third closest pixel on the right hand side of the boundary, wherein
the function is w1*a−w2*b−w3*c+w4*d+w5*e−w6*f, where w1, w2, w3, w4, w5 and w6 are weighting factors greater than or equal to zero, and
a being the third closest pixel on the left hand side, b being the second closest pixel on the left hand side, c being the closest pixel on the left hand side, d being the closest pixel on the right hand side, e being the second closest pixel on the right hand side, and f being the third closest pixel on the right hand side.

2. The method of claim 1, wherein w1=1, w2=1, w3=2, w4=2, w5=1 and w6=1.

3. A method comprising
performing, at a video decoding apparatus, a test of pixel lines crossing a boundary between first and second blocks in a block-wise coded video picture; and
modifying, at the video decoding apparatus, neighboring pixels on the pixel lines crossing the boundary with a $\Delta$ value calculated by a function based on a weighted sum of a third closest pixel on a left hand side of the boundary, a second closest pixel on the left hand side of the boundary, a closest pixel on the left hand side of the boundary, a closest pixel on a right hand side of the boundary, a second closest pixel on the right hand side of the boundary, and a third closest pixel on the right hand side of the boundary, wherein
the performing the test includes testing the following relation for the pixel lines $$\sum_{i \in S}(|a_i - 2b_i + c_i| + |d_i - 2e_i + f_i|) < \beta'(QP),$$

wherein i is a line number of lines in the subset S, and $\beta'(QP)$ is a threshold value dependent on a first quantization parameter for video decoding.

4. The method of claim 1, wherein modifying the neighboring pixels further comprises:
clipping the $\Delta$ within a value range $(-\gamma,\gamma)$, wherein $\gamma$ is a second quantization parameter found in a look-up table dependent on a first quantization parameter and a strength value for the boundary; and
calculating modified neighboring pixels according to the following relations $$b'=b+\Delta/2,$$

$$c'=c+\Delta,$$

$$d'=d-\Delta, \text{ and}$$

$$e'=e-\Delta/2,$$

wherein b', c', d' and e' are re-calculated values of corresponding original neighboring pixels values.

* * * * *